US012645919B2

(12) United States Patent     (10) Patent No.:   US 12,645,919 B2

Arik et al.      (45) Date of Patent:    Jun. 2, 2026

(54) SELF-ADAPTING FORECASTING FOR MULTI-HORIZON FORECASTING MACHINE LEARNING MODELS

(71) Applicant: Google LLC, Mountain View, CA (US)

(72) Inventors: Sercan Omer Arik, San Francisco, CA (US); Nathanael Christian Yoder, San Francisco, CA (US); Tomas Pfister, Redwood Shores, CA (US)

(73) Assignee: Google LLC, Mountain View, CA (US)

( * ) Notice: Subject to any disclaimer, the term of this patent is extended or adjusted under 35 U.S.C. 154(b) by 918 days.

(21) Appl. No.: 17/954,978

(22) Filed: Sep. 28, 2022

(65) Prior Publication Data

US 2023/0110117 A1     Apr. 13, 2023

Related U.S. Application Data

(60) Provisional application No. 63/255,239, filed on Oct. 13, 2021.

(51) Int. Cl.
*G06N 3/045*      (2023.01)
*G06N 3/0455*     (2023.01)
(Continued)

(52) U.S. Cl.
CPC .......... *G06N 3/045* (2023.01); *G06N 3/0455* (2023.01); *G06N 3/08* (2013.01); *G06N 3/084* (2013.01)

(58) Field of Classification Search
CPC ........ G06N 3/045; G06N 3/0455; G06N 3/08; G06N 3/0895; G06N 3/084; G06N 3/0442; G06N 3/044; G06N 3/0464; G06Q 10/04
See application file for complete search history.

(56) References Cited

U.S. PATENT DOCUMENTS 11,281,969 B1 *   3/2022   Rangapuram ........ G06N 3/0442
11,308,414 B2 *   4/2022   Kajino ................... G06N 20/00
(Continued)

OTHER PUBLICATIONS

Wang, Zhe, and Claude Guet. "Reconstructing a dynamical system and forecasting time series by self-consistent deep learning." arXiv preprint arXiv:2108.01862 (2021). (Year: 2021).*
(Continued)

*Primary Examiner* — Andrew L Tank
(74) *Attorney, Agent, or Firm* — Lerner David LLP

(57) ABSTRACT

Aspects of the disclosure provide for self-adapting forecasting (SAF) during the training and execution of machine learning models trained for multi-horizon forecasting on time-series data. The distribution of time-series data can shift over different periods of time. A deep neural network and other types of machine learning models are trained assuming that training data is independent and identically distributed (i.i.d.). With a computer system configured to execute SAF, the system can, at inference time, update a trained encoder to generate an encoded representation of time-series data capturing features characterizing the current distribution of the input time-series data. The updated encoded representation can be fed into a decoder trained to generate a multi-horizon forecast based on the updated encoded representation of the time-series data. At each instance of inference, the base weights of a trained model can be reused and updated to generate an updated encoded representation for that instance.

17 Claims, 9 Drawing Sheets

(51) Int. Cl.
    *G06N 3/08*      (2023.01)
    *G06N 3/084*    (2023.01)

(56)         References Cited

U.S. PATENT DOCUMENTS

| | | | | |
|---|---|---|---|---|
| 11,416,688 | B2 * | 8/2022 | Wu | G06N 3/08 |
| 11,494,587 | B1 * | 11/2022 | Ganesan | G06F 18/2148 |
| 11,670,072 | B2 * | 6/2023 | Sokhandan Asl | G06N 3/045 |
| | | | | 382/197 |
| 2019/0130249 | A1 * | 5/2019 | Bradbury | G06N 3/084 |
| 2019/0130273 | A1 * | 5/2019 | Keskar | G06F 40/47 |
| 2019/0130425 | A1 * | 5/2019 | Lei | G06Q 30/0201 |
| 2019/0147300 | A1 * | 5/2019 | Bathen | G06N 3/088 |
| | | | | 706/12 |
| 2019/0391574 | A1 * | 12/2019 | Cheng | G05B 23/024 |
| 2020/0097810 | A1 * | 3/2020 | Hetherington | G06N 3/09 |
| 2020/0134804 | A1 * | 4/2020 | Song | G06N 3/047 |
| 2020/0265303 | A1 * | 8/2020 | Osogami | G06N 3/0985 |
| 2020/0372329 | A1 * | 11/2020 | Oreshkin | G06N 20/20 |
| 2020/0380336 | A1 * | 12/2020 | Chowdhury | G06N 3/044 |
| 2021/0150305 | A1 * | 5/2021 | Amiri | G06N 5/02 |
| 2021/0216860 | A1 * | 7/2021 | Poghosyan | G06N 5/046 |
| 2021/0241152 | A1 * | 8/2021 | Fong | G06N 20/00 |
| 2021/0390457 | A1 * | 12/2021 | Romanowsky | G06N 5/04 |
| 2021/0394784 | A1 * | 12/2021 | Blaiotta | G06N 3/08 |
| 2021/0406765 | A1 * | 12/2021 | Zhang | G06N 3/08 |
| 2022/0058465 | A1 * | 2/2022 | Sen | G06N 3/09 |
| 2022/0067534 | A1 * | 3/2022 | Bai | G06N 3/088 |
| 2022/0083897 | A1 * | 3/2022 | Saha | G06N 20/00 |
| 2022/0083903 | A1 * | 3/2022 | Kontaxis | G06Q 50/06 |
| 2022/0103444 | A1 * | 3/2022 | Ranjan | G06N 3/0475 |
| 2022/0129747 | A1 * | 4/2022 | Cetintas | G06N 3/0985 |
| 2022/0138539 | A1 * | 5/2022 | Wong | G06N 3/096 |
| | | | | 706/25 |
| 2022/0172038 | A1 * | 6/2022 | Chen | G06N 3/08 |
| 2022/0318627 | A1 * | 10/2022 | Mizoguchi | G06N 3/09 |
| 2022/0327058 | A1 * | 10/2022 | Vu | G06F 12/0871 |
| 2022/0335257 | A1 * | 10/2022 | Arpit | G06N 3/084 |
| 2022/0383096 | A1 * | 12/2022 | Zhu | G06N 3/08 |
| 2022/0405611 | A1 * | 12/2022 | Singla | G06N 5/04 |
| 2023/0018125 | A1 * | 1/2023 | Lim | G06N 3/0442 |
| 2023/0071667 | A1 * | 3/2023 | McDonnell | G06N 3/049 |

OTHER PUBLICATIONS

De Vilmarest, Joseph, and Yannig Goude. "State-space models win the IEEE DataPort competition on post-covid day-ahead electricity load forecasting." arXiv preprint arXiv:2110.00334 (2021). (Year: 2021).*

Liu, Haitao, et al. "Deep Probabilistic Time Series Forecasting using Augmented Recurrent Input for Dynamic Systems." arXiv preprint arXiv:2106.05848 (2021). (Year: 2021).*

Crabbé, Jonathan, and Mihaela van der Schaar. "Explaining Time Series Predictions with Dynamic Masks." arXiv preprint arXiv: 2106.05303 (2021). (Year: 2021).*

Cao, Defu, et al. "Spectral Temporal Graph Neural Network for Multivariate Time-series Forecasting." arXiv preprint arXiv: 2103.07719 (2021). (Year: 2021).*

Yuan, Yuan, et al. "Using an attention-based LSTM encoder-decoder network for near real-time disturbance detection." IEEE Journal of Selected Topics in Applied Earth Observations and Remote Sensing 13 (2020): 1819-1832. (Year: 2020).*

Yang, Shuo, et al. "Adversarial recurrent time series imputation." IEEE transactions on neural networks and learning systems 34.4 (2020): 1639-1650. (Year: 2020).*

Smyl, Slawek. "A hybrid method of exponential smoothing and recurrent neural networks for time series forecasting." International journal of forecasting 36.1 (2020): 75-85. (Year: 2020).*

Rubin-Falcone, Harry, Ian Fox, and Jenna Wiens. "Deep Residual Time-Series Forecasting: Application to Blood Glucose Prediction." KDH@ ECAI 20 (2020): 105-109. (Year: 2020).*

Cui, Zhiyong, et al. "Stacked Bidirectional and Unidirectional LSTM Recurrent Neural Network for Forecasting Network-wide Traffic State with Missing Values." arXiv preprint arXiv:2005.11627 (2020). (Year: 2020).*

Agarwal, Kushagra, et al. "Deep Learning based Time Series Forecasting." 2020 19th IEEE International Conference on Machine Learning and Applications (ICMLA). IEEE, 2020. (Year: 2020).*

Luo, Yonghong, et al. "E2GAN: end-to-end generative adversarial network for multivariate time series imputation." Proceedings of the 28th International Joint Conference on Artificial Intelligence. 2019. (Year: 2019).*

Lim, Bryan, et al. "Temporal Fusion Transformers for Interpretable Multi-horizon Time Series Forecasting." arXiv preprint arXiv:1912.09363 (2019). (Year: 2019).*

Li, Shiyang, et al. "Enhancing the Locality and Breaking the Memory Bottleneck of Transformer on Time Series Forecasting." arXiv preprint arXiv:1907.00235 (2019). (Year: 2019).*

Finn, Chelsea, Kelvin Xu, and Sergey Levine. "Probabilistic Model-Agnostic Meta-Learning." arXiv preprint arXiv:1806.02817v2 (2019). (Year: 2019).*

Fan, Chenyou, et al. "Multi-horizon time series forecasting with temporal attention learning." Proceedings of the 25th ACM SIGKDD International conference on knowledge discovery & data mining. 2019. (Year: 2019).*

Clark, David G., Jesse A. Livezey, and Kristofer E. Bouchard. "Unsupervised Discovery of Temporal Structure in Noisy Data with Dynamical Components Analysis." arXiv preprint arXiv:1905.09944 (2019). (Year: 2019).*

Cao, Wei, et al. "BRITS: Bidirectional Recurrent Imputation for Time Series." arXiv preprint arXiv:1805.10572 (2018). (Year: 2018).*

Brooks, Logan C., et al. "Nonmechanistic forecasts of seasonal influenza with iterative one-week-ahead distributions." PLoS computational biology 14.6 (2018): e1006134. (Year: 2018).*

Moahmed, Tawfik A., Neamat El Gayar, and Amir F. Atiya. "Forward and backward forecasting ensembles for the estimation of time series missing data." IAPR workshop on artificial neural networks in pattern recognition. Cham: Springer International Publishing, 2014. (Year: 2014).*

International Search Report and Written Opinion for International Application No. PCT/US2022/045986 dated Dec. 23, 2022. 14 pages.

Liu et al. DeepFIB: Self-Imputation for Time Series Anomaly Detection. OpenReview.net: Sep. 29, 2021 (modified: Oct. 6, 2021), 12 pages. Retrieved from the Internet: <https://openreview.net/references/pdf?id=6JotPs9cCb>. [retrieved on Dec. 12, 2022].

Oreshkin et al. N-BEATS: Neural Basis Expansion Analysis for Interpretable Time Series Forecasting. arXiv:1905.10437v4, Feb. 20, 2020 (Feb. 20, 2020), 31 pages, DOI: 10.48550/arXiv.1905.10437. Retrieved from the Internet: <https://arxiv.org/abs/1905.10437v4>. [retrieved on Dec. 21, 2020].

Zerveas et al. A Transformer-based Framework for Multivariate Time Series Representation Learning. Proceedings of the 27th ACM SIGKDD Conference on Knowledge Discovery & Data Mining (KDD' 21), Aug. 14, 2021 (Aug. 14, 2021), pp. 2114-2124, DOI: 10.1145/3447548.3467401.

Bartler et al. MT3: Meta Test-Time Training for Self-Supervised Test-Time Adaption. Mar. 30, 2021. 10 pages. Retrieved from the Internet: <https://arxiv.org/abs/2103.16201v1>.

Brahim-Belhouari et al. Gaussian process for nonstationary time series prediction. Computational Statistics & Data Analysis, 47(4), pp. 705-712. Retrieved from the Internet: <https://citeseerx.ist.psu.edu/viewdoc/download?doi=10.1.1.595.1763&rep=rep1&type=pdf>.

Chen et al. Mandoline: Model Evaluation under Distribution Shift. Jul. 1, 2021. 32 pages. Retrieved from the Internet: <https://arxiv.org/abs/2107.00643v1>.

Chen et al. Robust Out-of-distribution Detection for Neural Networks. May 4, 2020. 21 pages. Retrieved from the Internet: <https://arxiv.org/abs/2003.09711v4>.

Dahlhaus et al. Fitting Time Series Models to Nonstationary Processes. 1997. The Annals of Statistics, 25(1), 43 pages. Retrieved from the Internet: <https://archiv.ub.uni-heidelberg.de/volltextserver/21356/1/beitrag.04.pdf>.

(56)                References Cited

OTHER PUBLICATIONS

Fang et al. Rethinking Importance Weighting for Deep Learning under Distribution Shift. Nov. 5, 2020. 18 pages. Retrieved from the Internet: <https://arxiv.org/abs/2006.04662>.

Finn et al. Model-Agnostic Meta-Learning for Fast Adaptation of Deep Networks. Jul. 18, 2017. 13 pages. Retrieved from the Internet: <https://arxiv.org/abs/1703.03400>.

Ganin et al. Domain-Adversarial Training of Neural Networks. May 26, 2016. 35 pages. Retrieved from the Internet: <https://arxiv.org/abs/1505.07818>.

Hansen et al. Self-Supervised Policy Adaptation during Deployment. Apr. 9, 2021. 18 pages. Retrieved from the Internet: <https://arxiv.org/abs/2007.04309>.

Hendrycks et al. A Baseline for Detecting Misclassified and Out-of-Distribution Examples in Neural Networks. Oct. 7, 2016. 14 pages. Retrieved from the Internet: <https://arxiv.org/abs/1610.02136v1>.

Hillmer et al. An ARIMA-Model-Based Approach to Seasonal Adjustment. Mar. 1982. Journal of the American Statistical Association, 77(377), pp. 63-70. Retrieved from the Internet: <https://www.istat.it/it/files/2014/06/An-ARIMA-Model-Based-Approach-to-Seasonal-Adjustment.pdf>.

Kang et al. Contrastive Adaptation Network for Unsupervised Domain Adaptation. Apr. 10, 2019. 10 pages. Retrieved from the Internet: <https://arxiv.org/abs/1901.00976>.

Koh et al. WILDS: A Benchmark of in-the-Wild Distribution Shifts. Dec. 14, 2020. 87 pages. Retrieved from the Internet: <https://arxiv.org/abs/2012.07421v1>.

Kuznetsov et al. Discrepancy-Based Theory and Algorithms for Forecasting Non-Stationary Time Series. 2020. Annals of Mathematics and Artificial Intelligence, 88(4), 36 pages. Retrieved from the Internet: <https://cs.nyu.edu/~mohri/pub/tsj.pdf>.

Kuznetsov et al. Learning Theory and Algorithms for Forecasting Non-Stationary Time Series. 2015. NIPS, 9 pages. Retrieved from the Internet: <http://papers.neurips.cc/paper/5836-learning-theory-and-algorithms-for-forecasting-non-stationary-time-series.pdf>.

Lim et al. Temporal Fusion Transformers for Interpretable Multi-horizon Time Series Forecasting. 2021. International Journal of Forecasting, 37(4), pp. 1748-1764. Retrieved from the Internet: <https://www.sciencedirect.com/science/article/pii/S0169207021000637>.

Montero-Manso et al. Principles and Algorithms for Forecasting Groups of Time Series: Locality and Globality. Aug. 10, 2020. 34 pages. Retrieved from the Internet: <https://arxiv.org/abs/2008.00444v2>.

Oreshkin et al. N-BEATS: Neural basis expansion analysis for interpretable time series forecasting. Dec. 31, 2019. 31 pages. Retrieved from the Internet: <https://arxiv.org/abs/1905.10437v3>.

Ovadia et al. Can You Trust Your Model's Uncertainty? Evaluating Predictive Uncertainty Under Dataset Shift. Dec. 17, 2019. 25 pages. Retrieved from the Internet: <https://arxiv.org/abs/1906.02530>.

Rhif et al. Wavelet Transform Application for/in Non-Stationary Time-Series Analysis: A Review. Mar. 30, 2019. Applied Sciences, 9(7), 22 pages. Retrieved from the Internet: <https://www.mdpi.com/2076-3417/9/7/1345>.

Salinas et al. DeepAR: Probabilistic Forecasting with Autoregressive Recurrent Networks. 2020. International Journal of Forecasting, 36(3), pp. 1181-1191. Retrieved from the Internet: <https://www.sciencedirect.com/science/article/pii/S0169207019301888>.

Sun et al. Test-Time Training for Out-of-Distribution Generalization. Oct. 25, 2019. 21 pages. Retrieved from the Internet: <https://arxiv.org/abs/1909.13231v2>.

Sutskever et al. Sequence to Sequence Learning with Neural Networks. Dec. 14, 2014. 9 pages. Retrieved from the Internet: <https://arxiv.org/abs/1409.3215>.

Wen et al. A Multi-Horizon Quantile Recurrent Forecaster. Nov. 29, 2017. 31st Conference on Neural Information Processing Systems (NIPS 2017), Long Beach, CA, USA. 8 pages. Retrieved from the Internet: <https://arxiv.org/abs/1711.11053v1>.

Yu et al. Temporal Regularized Matrix Factorization for High-dimensional Time Series Prediction. 2016. Advances in Neural Information Processing Systems 29 (NIPS 2016). 9 pages. Retrieved from the Internet: <https://papers.nips.cc/paper/2016/file/85422afb467e9456013a2a51d4dff702-Paper.pdf>.

Zhou et al. Informer: Beyond Efficient Transformer for Long Sequence Time-Series Forecasting. Mar. 28, 2021. 15 pages. Retrieved from the Internet: <https://arxiv.org/abs/2012.07436>.

* cited by examiner

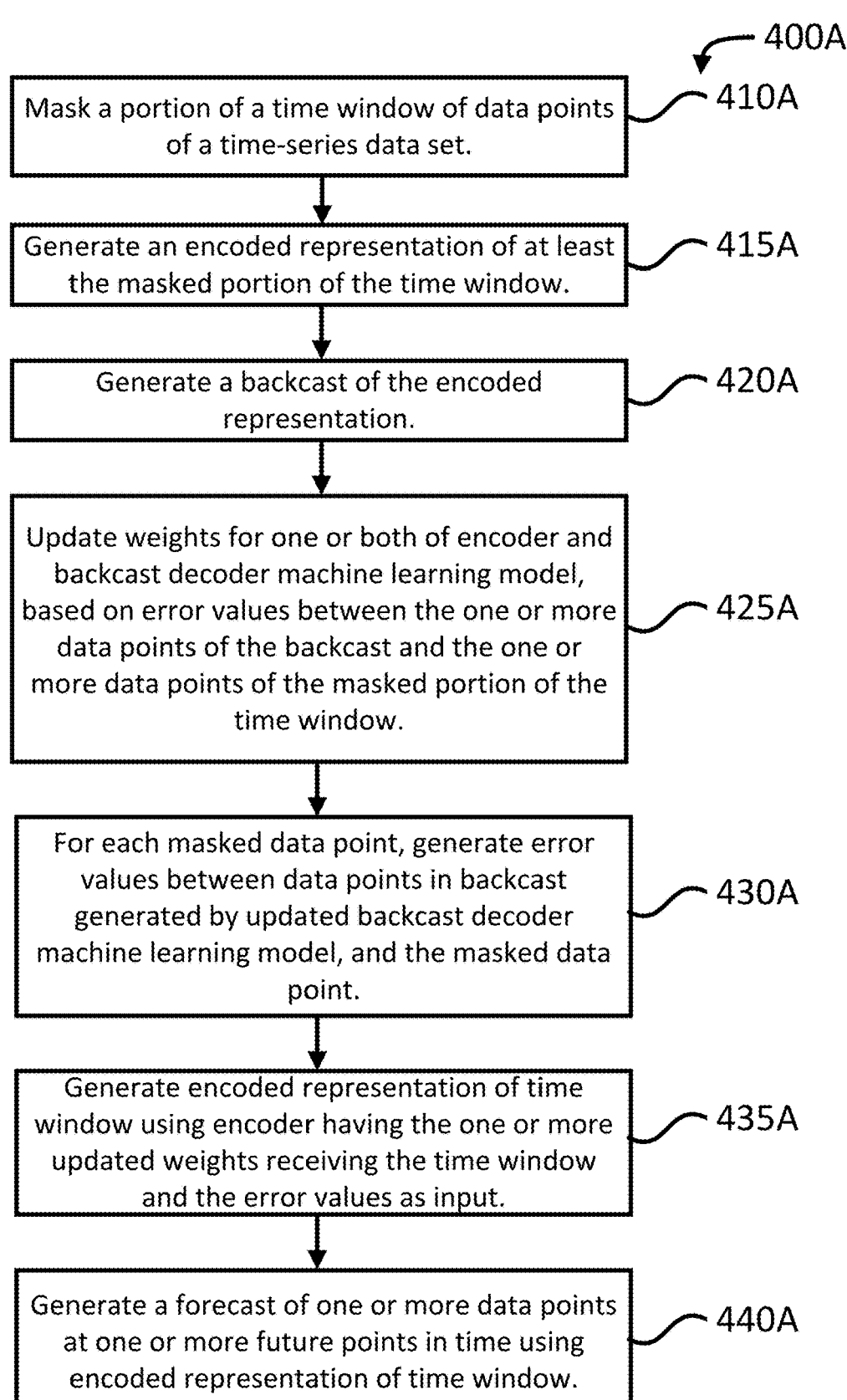

400A

Mask a portion of a time window of data points of a time-series data set. — 410A Generate an encoded representation of at least the masked portion of the time window. — 415A Generate a backcast of the encoded representation. — 420A Update weights for one or both of encoder and backcast decoder machine learning model, based on error values between the one or more data points of the backcast and the one or more data points of the masked portion of the time window. — 425A For each masked data point, generate error values between data points in backcast generated by updated backcast decoder machine learning model, and the masked data point. — 430A Generate encoded representation of time window using encoder having the one or more updated weights receiving the time window and the error values as input. — 435A Generate a forecast of one or more data points at one or more future points in time using encoded representation of time window. — 440A

FIG. 4A

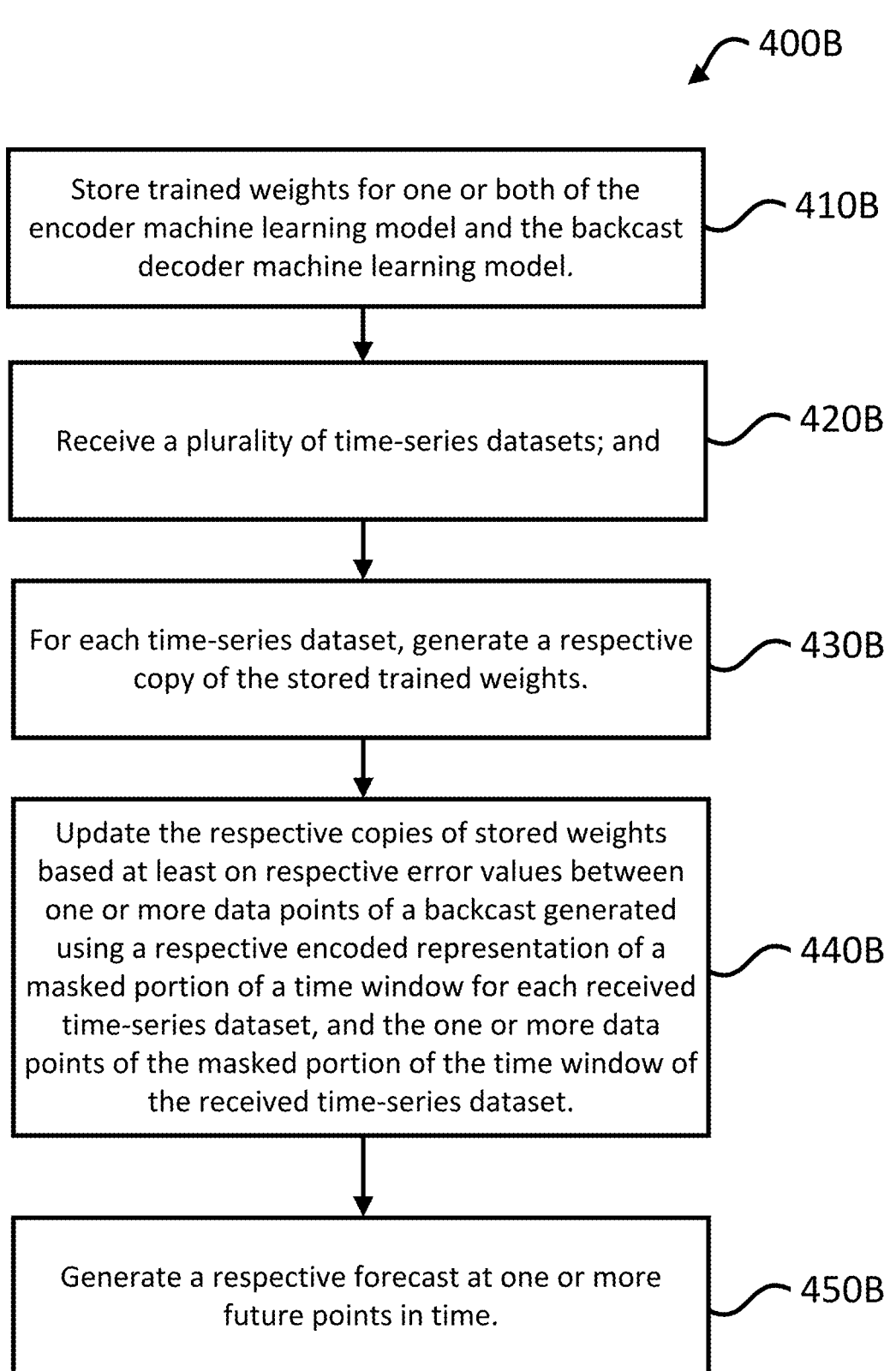

400B

Store trained weights for one or both of the encoder machine learning model and the backcast decoder machine learning model. — 410B Receive a plurality of time-series datasets; and — 420B For each time-series dataset, generate a respective copy of the stored trained weights. — 430B Update the respective copies of stored weights based at least on respective error values between one or more data points of a backcast generated using a respective encoded representation of a masked portion of a time window for each received time-series dataset, and the one or more data points of the masked portion of the time window of the received time-series dataset. — 440B Generate a respective forecast at one or more future points in time. — 450B

SELF-ADAPTING FORECASTING FOR MULTI-HORIZON FORECASTING MACHINE LEARNING MODELS

CROSS-REFERENCE TO RELATED APPLICATIONS

The present application claims the benefit of the filing date of U.S. Provisional Patent Application No. 63/255,239, filed Oct. 13, 2021, the disclosure of which is hereby incorporated herein by reference.

BACKGROUND

Time-series data is a collection of data points indexed in time order. A data point can be an individual value or data structure of values, such as a vector, quantifying characteristics of an observed system over time. Data points within a time-series dataset can be non-stationary within different subsets—or "windows"—of points in the dataset. Non-stationary data points vary in statistical distribution over different windows in a dataset, whereas stationary data points do not. A time-series dataset with non-stationary data points is a non-stationary dataset.

Time-series forecasting is a class of machine learning tasks for training a machine learning model to generate predictions based on time-series data. Depending on the specific type of time-series forecasting task, a model can be trained to generate outputs that are interpreted as forecasts, for example, for predicting the likelihood a patient will develop a particular disease, or for predicting characteristics of weather or climate shifts globally or within a geographic region of interest. A forecast horizon (or, "horizon") is a length of time into the future in which forecasts are made by a trained model. Multi-horizon forecasting is the task of generating multiple forecasts at different points in the future up to a horizon. For example, a forecast for a horizon 12 months in the future may include forecasts 1 month in the future, 2 months in the future, and so on, up to 12 months in the future.

BRIEF SUMMARY

Aspects of the disclosure provide for processing time-series data on machine learning models trained for multi-horizon forecasting, using self-adapting forecasting. Real-world time-series datasets often violate the assumptions of standard supervised machine learning, which assume that the distributions of the datasets do not vary over time. Instead, time-series datasets are often non-stationary, with distributions of data points changing over time to reflect changes in a system or process observed and measured using time-series data. Applying standard supervised machine learning in these use cases is suboptimal, as model performance, measured for example based on accuracy, recall, or precision of the model, is reduced when non-stationary time-series data is used for model training and/or model selection.

Aspects of the disclosure provide for systems configured for training and executing machine learning models on non-stationary time-series data, using self-adapting forecasting (SAF). A SAF system generates encoded representations of time-series data as the data changes over time. The encoded representations can represent up-to-date features characterizing the distribution of an input window of data points. SAF-encoded representations can improve the model performance in forecasting, without requiring the model itself to be trained every time an input window with a new distribution of data points is received as input by the model. A SAF training system can train any canonical encoder-decoder based time-series architecture, such as recurrent neural networks or attention-based architectures.

Aspects of the disclosure include a computer-implemented method for training a machine learning model including an encoder machine learning model, a backcast decoder machine learning model, the method including: masking, by the one or more processors, a time window of data points of a time-series dataset, the masked portion including one or more data points of the time window; generating, by one or more processors, an encoded representation of at least the masked portion of the time window using the encoder machine learning model including one or more weights and trained to generate an encoded representation at least from time-series data provided as input to the encoder machine learning model; generating, by the one or more processors, a backcast of the encoded representation, using the backcast decoder machine learning model trained to predict backcasts including one or more data points of a masked portion of the encoded representation at least from an unmasked portion of the encoded representation; and updating, by the one or more processors, respective one or more weights of one or both of the encoder machine learning model and the backcast decoder machine learning model, based at least on respective error values between the one or more data points of the backcast and the one or more data points of the masked portion of the encoded representation.

Other aspects of the disclosure include a system including one or more processors configured to perform the computer-implemented method, and one or more non-transitory computer-readable storage media encoding instructions that, when executed by one or more processors, cause the one or more processors to perform the computer-implemented method.

Aspects of the disclosure can include one or more of the following features. In some examples, aspects of the disclosure include different combinations of the following, including one implementation having all of the following features.

The method can further include generating, by the one or more processors, an encoded representation of the time window using the encoder machine learning model including one or more updated weights; and generating, by the one or more processors, a forecast of one or more data points at one or more future points in time using the encoded representation of the time window.

The encoder machine learning model can be further trained to: receive the time window and, for each masked data point of the time window, a respective error value between a data point generated by the backcast decoder machine learning model including one or more updated weights, and the masked data point before the masked data point was masked; and generate the encoded representation of the time window using the time window and the respective error value for each masked data point.

The machine learning model can further include a forecast decoder machine learning model, generating the forecast includes generating the forecast using the forecast decoder machine learning model trained to generate the forecast using the encoded representation of the time window.

The method further includes updating, by the one or more processors, respective one or more weights for one or both of the encoder machine learning model and the forecast decoder machine learning model, using error values between the one or more generated data points of the forecast and one or more ground-truth data points corresponding to the one or more future points in time.

Masking the portion of the time window can include masking the portion of the time window using a data point of an unmasked portion of the time window.

The masked portion of the encoded representation can be half of the number of timesteps in the time window.

Updating the respective one or more weights for one or both of the encoder machine learning model and the backcast decoder machine learning model can further include: performing, by the one or more processors, a single-step gradient descent update on the respective one or more weights for one or both of the encoder machine learning model and the backcast decoder machine learning model.

The method can further include storing, by the one or more processors, trained weights for one or both of the encoder machine learning model and the backcast decoder machine learning model; receiving, by the one or more processors, a plurality of time-series datasets; and for each received time-series dataset, generating, by the one or more processors, a respective copy of the stored trained weights, updating, by the one or more processors, the respective copy of stored weights for one or both of the encoder machine learning model and the backcast decoder machine learning model based at least on respective error values between one or more data points of a backcast generated using a respective encoded representation of a masked portion of a time window in the received time-series dataset, and the one or more data points of the masked portion of the time window of the received time-series dataset, and generating, by the one or more processors, a respective forecast of the one or more data points at the one or more future points in time using at least one or both of the encoder machine learning model and the backcast decoder machine learning model including the respective updated copy of stored weights.

BRIEF DESCRIPTION OF THE DRAWINGS

FIG. 4A is a flowchart of an example process for processing observed data through a multi-horizon forecasting model using SAF, according to aspects of the disclosure.

FIG. 4B is a flowchart of an example process for processing different time-series datasets through a multi-horizon forecasting model using SAF, according to aspects of the disclosure.

DETAILED DESCRIPTION

Overview

Figure 1:
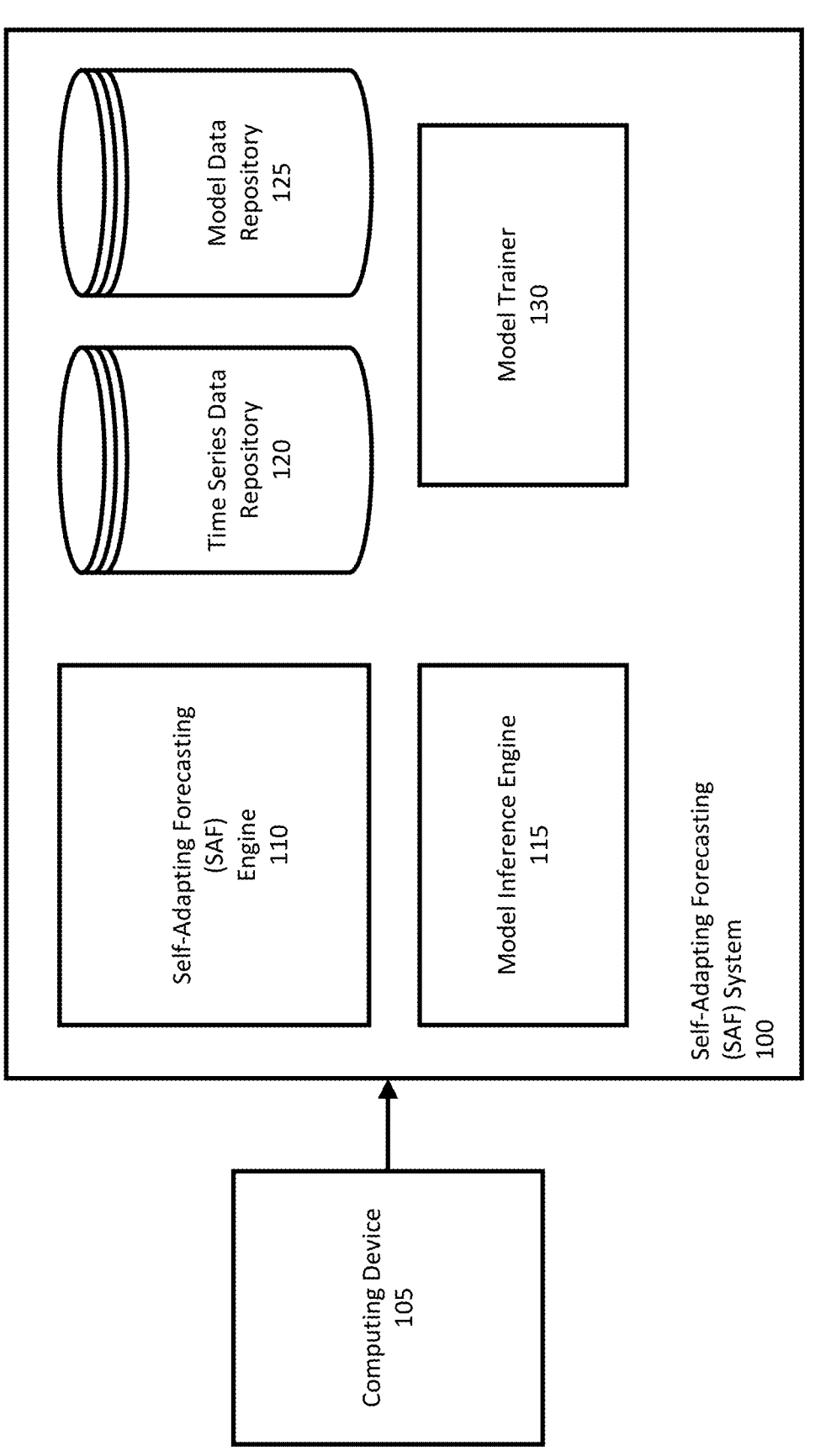
FIG. 1 is a block diagram of an example self-adapting forecasting system, according to aspects of the disclosure.

Aspects of the disclosure provide for self-adapting forecasting (SAF) during the training and execution of machine learning models trained for multi-horizon forecasting on time-series data. A distribution of a set of data is a function of the possible values or intervals of data points within the data, as well as the probability at which different values of data points occur within the set of data. Standard supervised learning assumes that training, validation, and test datasets come from the same distribution, and that each sample is independently and identically distributed (i.i.d.). However, the non-stationarity of time-series data can make the application of standard supervised learning to training models to perform multi-horizon forecasting error-prone or impossible.

Aspects of the disclosure provide for a system including one or more processors and configured to, at inference time, update a trained encoder of a machine learning model to generate an encoded representation of time-series data capturing features characterizing the current distribution of the input time-series data. The updated encoded representation can be fed into a forecast decoder trained to generate a multi-horizon forecast based on the updated encoded representation of the time-series data. At each instance of inference, the base weights of a trained model that includes the encoder and decoder can be reused and updated to generate an updated encoded representation for that instance of executing the trained model.

A SAF system generates encoded representations that use an encoder and a backcast decoder that are updated according to a backcasting self-supervised objective during a self-adapting stage. In contrast to forecasting, backcasting is the task of predicting data characterizing an observed system at earlier points in time, based on observations available later in time.

The SAF system masks and generates an encoded representation of a portion of an input time window of input time-series data. The self-supervised objective during the self-adapting stage can be to reduce the error between data points in predicted backcasts, and the ground-truth data points at the time or times of interest. The errors are used to compute a loss function, which is then used to perform one or more steps of weight updates based on a computed gradient of the weights with respect to the loss function.

The weights of the encoder and backcast decoder can be updated, to generate an improved encoding/decoding of time-series data. These updated encoded representations reflect the current state of the varying distribution, on which the decoded forecasts are conditioned. SAF expressly utilizes the component of time in time-series data to address distribution drift, training the encoder and backcast decoder to encode input time-series data to account for its distribution and drift in that distribution over time. The trained encoder and backcast decoder can generate similar encoded representations for windows of time-series data having similar distributions. SAF identifies patterns in evolving distributions to minimize the impact of distribution mismatch (for example, different distributions for testing and validation sets), through the improved encoding of time-series data based on the backcast loss of masked portions of input data at inference time.

As opposed to forecasting, in which one or few features or covariates of a data point are forecasted for a horizon, the SAF system can backcast all of the input features or covariates of each data point at a timestep, to better learn varying distributions jointly modeling all of the input features.

After the self-adapting stage, the SAF system moves into the forecasting stage. The forecast decoder can be part of the same or different machine learning model including the encoder. The forecast decoder can be trained to forecast data points at future points, up to a horizon, using an encoded representation generated by the encoder. The state of the distribution of time-series data in an encoded representation in a window of interest can affect the accuracy of a forecast by the forecast decoder.

In addition to providing the encoded representation from the updated encoder following the self-adapting stage, the encoder can provide the forecast decoder with error values between data points of predicted backcasts by the updated backcast decoder, and ground-truth data points of points of time of interest. The forecast decoder can use the error values as an additional signal as to the "backcastability" of input time-series data. The backcastability of input time-series data can reflect the amount of change in the distribution, which for example may be a source of large amounts of backcast error. The trained multi-horizon forecasting model may adjust its forecasting, accordingly. For example, the model may output more typical values rather than an outlier in the presence of large backcast error values, indicating higher levels of unpredictability.

SAF can improve model performance for models trained to perform various multi-horizon time-series forecasting tasks in different domains, such as in finance, health, retail, and environmental sciences. Non-stationarity in the time-series data may emerge as the corresponding systems observed through the time-series data change in behavior. These changes in behavior can be at least partially attributed to long-term patterns emerging from different sources influencing behavior in the observed system.

For example, if time-series data is of transactions of a financial trading market, the increase of popularity in trading algorithms to instruct and automate trading decisions as increased over time has caused a shift in trading behavior, which may not be accounted for in existing machine learning models trained on financial data from a time in which trading algorithms were not as heavily in use. As a result of this shift in behavior, existing models for multi-horizon series forecasting do not extract and process signals from the change in distributions of output trading data. In turn, the model may miss valuable insight through these missed signals, resulting in sub-optimal model performance.

As other examples, healthcare-related time-series forecasting is also susceptible to long-term and seasonal patterns affecting systems for patient diagnosis and treatment. For instance, the effects of increased obesity and other diseases may affect what and in what quantity different drugs or treatment plans are demanded. Even for time-series data within the past few years, different health-care events, such as the COVID-19 pandemic, can affect the distribution of time-series data in a way not captured by models trained before the occurrence of these events.

In these examples, a model not trained on similarly distributed data will fail to identify additional features that may be used to accurately predict the distribution of input time-series data. These features can include exogenous covariates, such as independent variables that may affect the output prediction of a model but that occur from outside the observed system. While retraining a model on updated time-series data may address the symptoms of the problem introduced by non-stationarity in time-series data, the retrained model is susceptible to missing evolving distributions as new time-series data is generated. Further, these additional features may not be identifiable using conventional approaches.

Example Systems

FIG. 1 is a block diagram of an example self-adapting forecasting (SAF) system 100, according to aspects of the disclosure. An example computing environment for implementing the SAF system 100 is described herein, with reference to FIG. 6.

In some examples, such as shown in FIG. 1, the SAF system 100 can include a SAF engine 110, a model inference engine 115, a time-series data repository 120, a model data repository 125, and a model trainer 130. In some examples, the SAF system 100 can include more or fewer components and can communicate with some or other components on one or more computing devices that may or may not be part of the SAF system 100. In some examples, the SAF system 100 can be a pre-existing system for training and executing machine learning models, augmented with the SAF engine 110 configured to perform operations and processes described herein.

The model inference engine 115 can be configured to perform model inference of a trained machine learning model, for example in response to a request from computing device 105. The computing device 105 can be, for example, a user computing device having a user interface for receiving and providing user input and output, respectively. In some examples, the SAF system 100 can be implemented as part of a computing platform configured to communicate with the computing device 105 over a network (not shown). The computing platform can provide services for training models and executing trained models.

The model inference engine 115 can access model data corresponding to a machine learning model from the model data repository 125. In some examples, model data can be provided by the computing device 115 to the SAF system 100.

If the model inference engine 115 is executing a model trained for multi-horizon forecasting, the model inference engine 115 can communicate with the SAF engine 110 to provide self-adapting forecasting at inference time of the model being executed. As described herein with reference to FIG. 2, the SAF system 100 can execute a processing pipeline for updating base weights of an encoder and a backcast decoder of a trained model during inference time, before generating a multi-horizon forecast. During a forecasting stage of SAF, an updated encoder of the trained model can provide, to a forecast decoder, an encoded representation of input time-series data and backcast error values, for generating a multi-horizon forecast.

The model trainer 130 can be configured to train a machine learning model according to any of a variety of different learning regimes, including supervised, unsupervised, and/or semi-supervised learning. The model trainer 130 can receive a request to train a model having certain architectural features, and/or to train the model according to certain hyperparameters, convergence criteria, or training algorithm. As part of training a model for multi-horizon forecasting using SAF, the model SAF engine 110 can communicate with the model trainer 130 to augment the training of a multi-horizon forecasting model. For example, the model trainer 130 may train multi-horizon forecasting models with or without SAF. If SAF is enabled, the SAF engine 110 and the model trainer 130 can perform a process, such as the process described with respect to FIG. 5, for training the model using SAF.

The time-series data repository 120 can store time-series data, from which the model inference engine 115 or the model trainer 130 uses to execute or train a model, respectively. As with the model data, in some examples time-series data can be provided from another source external to the SAF system 100, such as from the computing device 105.

The SAF system is model-independent. Any of a variety of machine learning models trained for multi-horizon forecasting, such as models based on encoder-decoder or attention-based architectures, can be implemented with SAF.

Figure 2A:
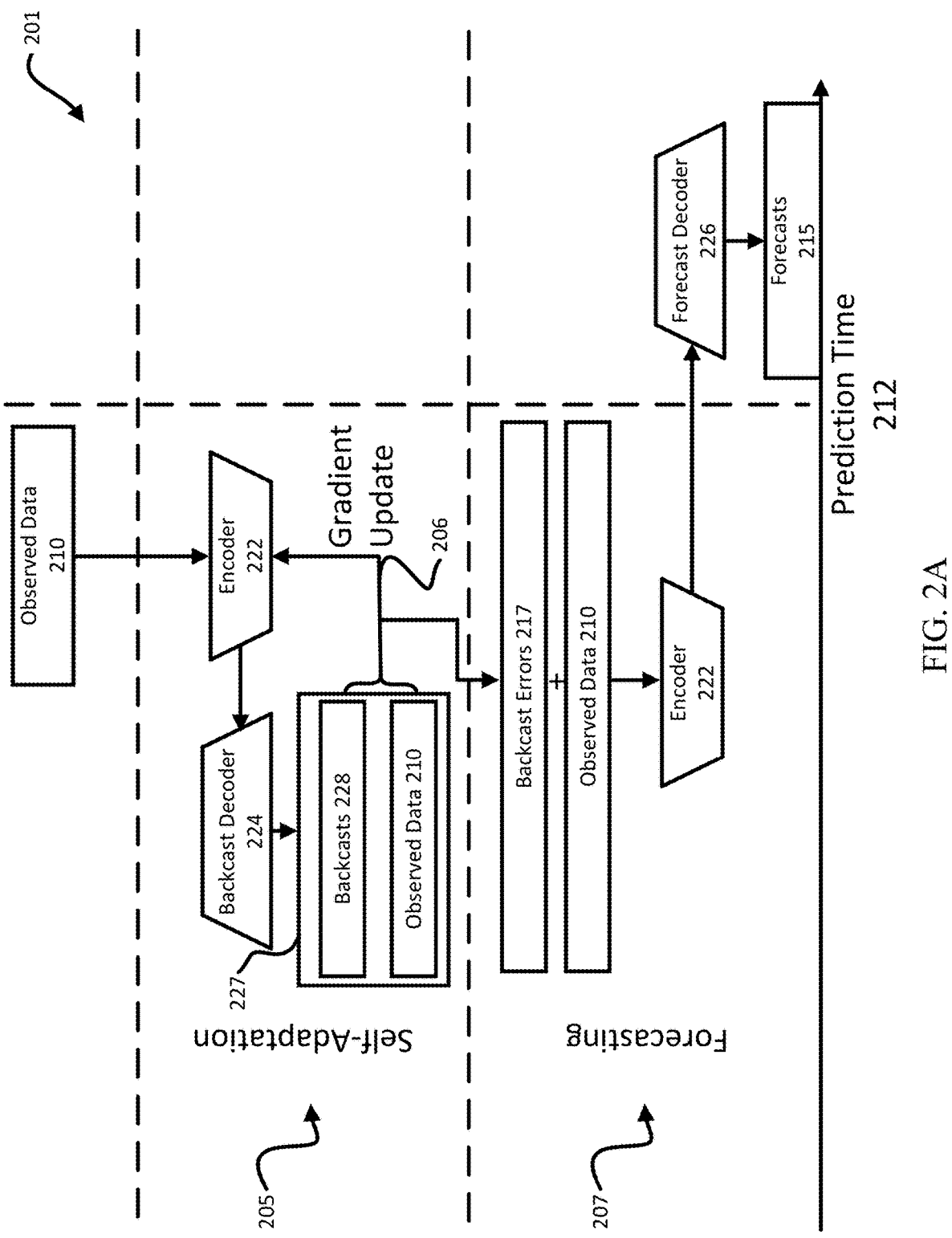
FIG. 2A is a flow diagram of an example processing pipeline for the SAF system at inference, according to aspects of the disclosure.

FIG. 2A is a flow diagram of an example processing pipeline 201 for the SAF system 100 at inference. The pipeline 201 has a self-adapting stage 205 and a forecasting stage 207. The pipeline 201 receives observed data 210, and at prediction/inference time 212, generates forecasts 215.

The processing pipeline 201 includes an encoder 222, a backcast decoder 224, and a forecast decoder 226, the operation of which is described herein. Each encoder or decoder can be implemented as one or more machine learning models. For example, each encoder and decoder can be a respective recurrent neural network, such as a long short-term memory (LSTM) neural network. The encoder 222 and forecast decoder 226 can be part of a pre-trained sequence-to-sequence model, such as an LSTM sequence-to-sequence model. In some examples, the encoder 222 can be an encoder for an attention-based model and include a machine learning model trained to encode input data using a self-attention mechanism. In those examples, one or both of the backcast and forecast decoders can be multi-layer perceptrons (MLPs) trained to map encoded representations of a timestep to predicted backcasts or forecasts. Any of a variety of other model architectures can be used for implementing the encoder 222, backcast decoder 224, and/or forecast decoder 226, including encoder-decoder architectures with convolutional or relational layers.

As another example of model architecture, when the encoder 222 and the forecast decoder 226 are part of an LSTM sequence-to-sequence model, the backcast decoder 224 can be based on another LSTM. In some examples, the SAF system 100 maps static features of the observed data 210, such as data that does not vary with time, with a multi-layer perceptron. Mapped static representations can be added or concatenated to the encoded representation generated by the encoder 222. Whether the static representations are added or concatenated can be controlled as a hyperparameter.

When the encoder 222 and the forecast decoder 226 are part of a TFT, the backcast decoder 224 can include a dense layer mapping attention outputs to forecasts.

Observed data 210 includes time-series data, such as a collection of data points in a temporal order. The temporal order can be for example, defined relative to each data point, such as a first data point preceding a second data point, which precedes a third data point, and so on. Observed data 210 can include data from multiple entities or observed systems, each with its own respective time-series dataset. For example, the observed data 210 can be financial trading data, with different entities representing different companies buying and selling financial assets on the observed market.

In some examples, the observed data 210 can include metadata corresponding to a point in time, such as a timestamp in which a particular data point was observed or recorded. Time can be represented in the time-series data as a sequence of timesteps. Timestep zero can represent the first point in time in which data recorded in a time-series dataset is observed. Time t can represent the current timestep at the time of prediction. Timesteps before the current time t are in the past, while timesteps after the current time t are in the future. Prior to receiving the observed data 210, the SAF system 100 or another upstream system can pre-process the data, for example by performing temporal alignment, or normalizing the data. A model trained for multi-horizon forecasting can receive input time-series data time windows. A time window is defined as a range of timesteps.

The SAF system 100 encodes the observed data 210 using the encoder 222. The encoder 222 generates an encoded representation of the observed data 210. For example, the encoded representation can be a context vector or other data structure and may have the same or different dimensionality as the data points of the time window. The encoder 222 is trained, as described herein, to learn an encoded representation of the observed data 210 that encodes information about the distribution of the observed data 210.

Once trained, the encoder 222 encodes observed data of similar states to similar encoded representations. In other words, the trained encoder 222 can encode time windows of similar distributions in time-series data, to similar encoded representations. The similarity of encoded representations for similar states in windows of observed data is used by the forecast decoder 226 to generate forecasts 215.

During the self-adapting stage 205, the encoder 222 is updated to generate encoded representations reflecting features of the state of a current time window within the observed data 210, including its distribution. The updates to the encoder 222 are the adaptation of the SAF system 100 to the distribution of the observed data 210.

To generate the updated encoded representations, the self-adapting stage 205 includes a gradient update 206. During the gradient update 206, the SAF system 100 masks a portion of the data points in a time window of the observed data, 210. The mask hides the portion of the time window from the backcast decoder 224. The backcast decoder 224 receives an encoded representation of the masked portion of the window generated by the encoder 222. The backcast decoder generates backcasts 228 using the unmasked portion of the time window and the encoded representation of the masked portion of the time window. The backcasts are predicted data points of the masked portion of the time window.

Figure 2B:
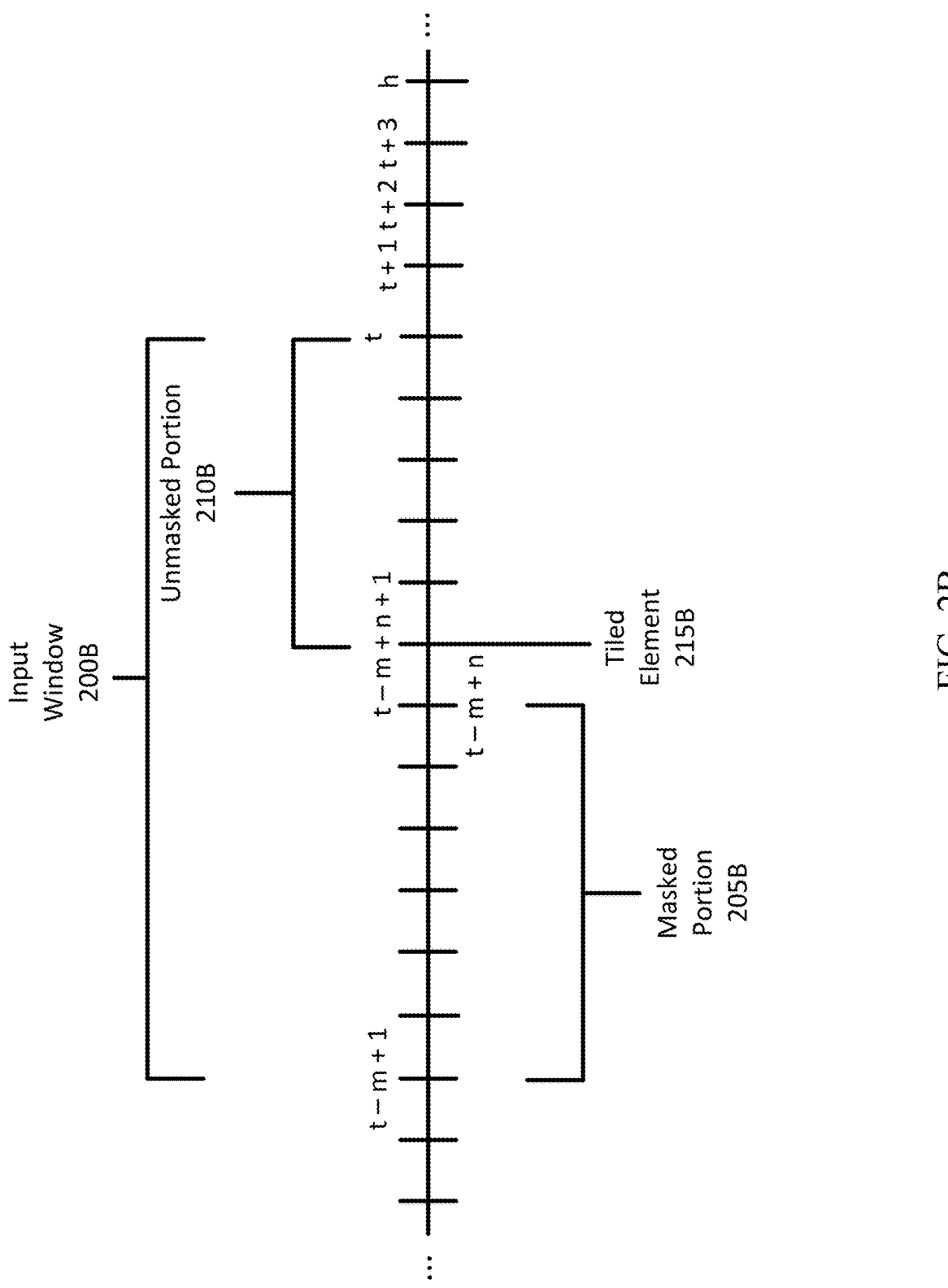
FIG. 2B is a block diagram of a timeline of observed data and an input window having a masked portion and unmasked portion, according to aspects of the disclosure.

FIG. 2B is a block diagram of a timeline 201B of observed data and an input window 200B of a masked portion 205B and an unmasked portion 210B. The SAF system 100 can receive observed data (not shown) at each timestep in the timeline 201B. Timestep t in FIG. 2B is the time at which the SAF system 100 processes incoming observed data to generate a forecast up to a horizon h. As part of generating the forecast, the SAF system 100 generates a respective forecast for each future timestep (i.e., timesteps after timestep t) up to and including timestep h. In FIG. 2B, the SAF system 100 generates a forecast at timestep t+1, timestep t+2, timestep t+3, and timestep h. A horizon can be any number of timesteps ahead of the prediction timestep, including a single timestep, for example, t+1.

An input window of time-series data is defined according to a window length m. The length can be measured backward, in timesteps, starting from the prediction time t. The window length can vary in length, up to the initial timestep (timestep zero) of the time-series data. The window length can be predetermined or received as input at prediction time. Different window lengths provide for different trade-offs in computational efficiency and accuracy. For example, a larger window includes more observed data that can result in more accurate forecasts, at the cost of additional compute resources required to process the large window. Smaller windows may be desired in some applications, for example based on the type of forecast being generated and whether smaller windows more recent in time to the prediction time t are found to be better or worse indicators of values of an output forecast.

In addition to the input window length, a masked portion length n is also defined. The masked portion length can also be a variety of different positive values but is smaller than the input window length. In some examples, the masked portion length is half of the input window length. The masked portion length n represents the length of the masked portion 205B of the input window 200B. As shown in FIG. 2B, the masked portion 205B begins at timestep t−m+1 and extends to timestep t−m+n. The portion of the input window 200B that is not masked is the unmasked portion 210B. The observed data of the masked portion 205B is masked, for example, using observed data of the unmasked portion 210B, such as observed data for the last timestep in the unmasked portion 210B (e.g., the observed data at timestep t−m+n+1 as shown in FIG. 2B, referred to as tiled element 215B). The SAF system 100 can apply a tile function to copy the tiled element 215B in the unmasked portion 210B and copy the data to each timestep in the masked portion 205B. Using the observed data at a timestep of the unmasked portion 210B instead of an arbitrary constant can prevent covariate shift for the SAF system 100 when processing the input window 200B.

Returning to FIG. 2A, at block 227, the SAF system 200 computes the loss between the predicted backcasts 228 and the masked portion of the observed data 210. The SAF system 100 can compute error values using any of a variety of error metrics, for example metrics used in computing forecasting loss. Example metrics include L1 and L2 loss functions to generate a loss based on the individual errors measured, for example, as the absolute or squared difference between the backcasts 228 and the masked portion of the observed data 210.

Weights of the encoder 222 and the backcast decoder 224 are updated using a single-step gradient descent update, based on the error computed in block 227. In other examples, multiple iterations of gradient descent and weight update can be performed in the self-adapting stage 205, instead of a single update. However, even a single-step gradient descent update can improve the encoder 222 and backcast decoder 224 in encoding features of the distribution of the observed data 210 in a corresponding encoded representation.

For each inference on different time-series datasets by the SAF system 100, a copy of the weights for the encoder 222 and backcast decoder 224 are saved before being updated in the self-adapting stage 205. In other words, the original pre-trained model is not altered between inference instances. In this way, the base weights may be updated differently depending, for example, on differences in distribution between the data the pre-trained model was trained on, and the observed data 210.

After the self-adapting stage 205, the SAF system 100 moves to the forecasting stage 207. In the forecasting stage 207, the SAF system computes backcast errors 217, and provides errors 217 and the observed data 210 to the encoder 222. The backcast errors 217 can be the error values between ground-truth data points at the timesteps of the masked portion of the time window, with the backcasts 228 generated by the backcast decoder 224 using the encoded representation of the time window with a masked and unmasked portion. By the forecasting stage 207, the encoder 222 and the backcast decoder 224 have been updated per the gradient update 206.

The encoder 222 receives the backcast errors 217 and the observed data 210, for example a time window of time-series data. The encoder 222 can be trained to generate encoded representations from time-series data with or without the backcast errors 217, for example by appending zero or the error values to the input as appropriate. For example, in the self-adapting stage 205, the encoder 222 does not receive backcast errors 217 as part of generating an encoded representation. As described herein, receiving the backcast errors 217 can provide an additional signal for the encoder 222 to use in generating the encoded representation of the observed data 210. The backcast errors 217 can quantify a degree of unpredictability in the model at forecasting a particular timestep, which may inform the model as to the level of non-stationarity of the observed data. 210.

The forecast decoder 226 receives the encoded representation of the observed data 210 and uses the encoded representation to generate the forecasts 215 for a forecast horizon. On new observed data, such as a new time-series dataset, the SAF system 100 can perform the processing pipeline 201 again, using stored base weights for the encoder 222 and the backcast decoder 224. As described with reference to FIG. 5, the encoder 222, the backcast decoder 224, and the forecast decoder 226 can be trained using SAF. After training, the encoder 222, the backcast decoder 224, and the forecast decoder 226 can be implemented as part of the processing pipeline 201 for processing new observed data using SAF.

Figure 3A:
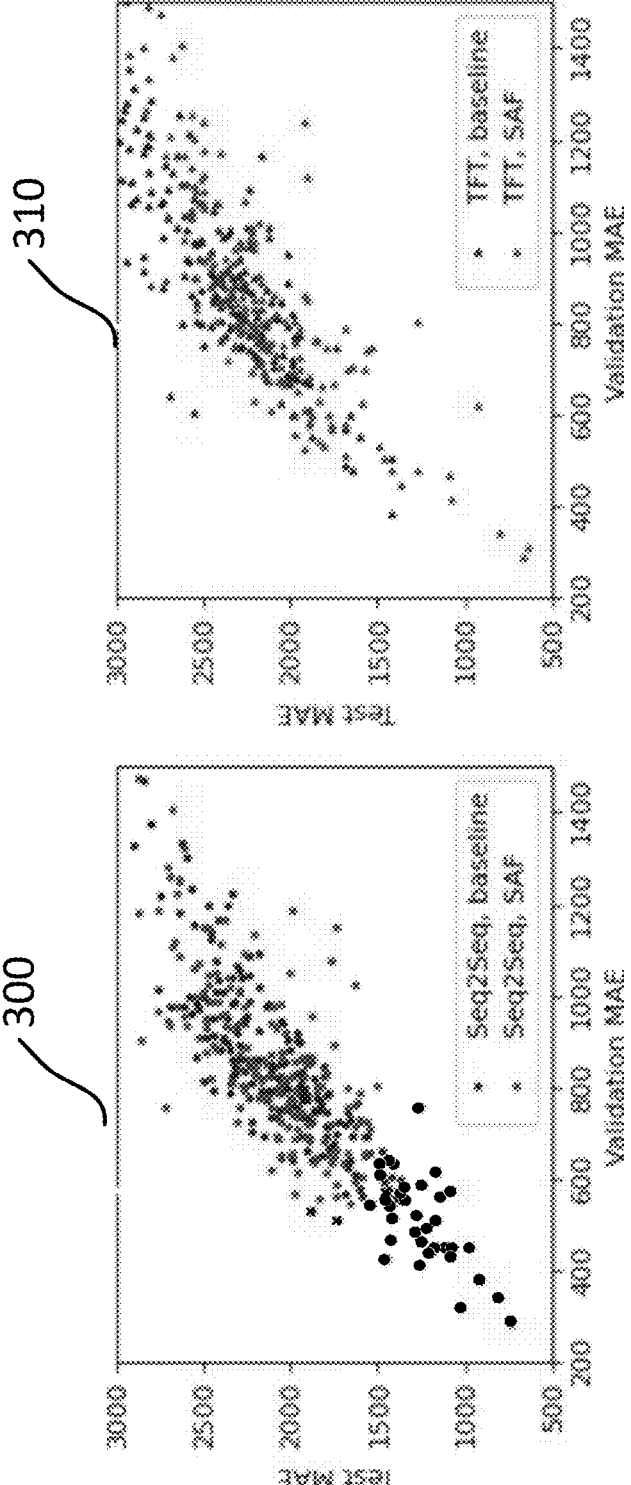
FIG. 3A illustrates charts representing the mean absolute error (MAE) between baseline models and models using SAF for both validation and test data, according to aspects of the disclosure.

FIG. 3A illustrates charts 300, 310, representing the mean absolute error (MAE) between baseline models and models using SAF for both validation and test data. The MAE is a measure of error between a model in processing a set of data. MAE is a measure of the average of the absolute difference between each model output (here, a predicted forecast), with a respective ground-truth forecast for the input time-series data used to generate the model output. Validation MAE, as shown along the x-axis of the charts 300, 310 refers to the MAE of a validation dataset of time-series data. Test MAE, as shown along the y-axis of the charts 300, 310, refers to the MAE of a test dataset of time-series data. Lower MAE values, i.e., closer to the origins of the charts 300, 310, correspond to less error overall versus higher MAE values.

The training, validation, and test datasets can be generated from a larger collection of training data for training a machine learning model for multi-horizon forecasting, with or without SAF. The blue dots in chart 300 correspond to the validation and test MAE of a seq2seq model without using SAF, which is denoted as the "baseline." The red dots in chart 300 correspond to the validation and test MAE of the same seq2seq model with SAF. The blue and red dots in chart 310 similarly show validation and test MAE of a TFT at baseline and using SAF, respectively. The charts 300, 310 of FIG. 3 illustrate how SAF can improve both validation performance, as well as the correlation between validation and test correlation across runs.

Each dot is the result of measuring the performance of the model under different trials, in which different hyperparameters were used to train the model on the same training data.

Example hyperparameters for the trials are shown below, in TABLE 1. Some hyperparameters correspond to training using a particular architecture, such as TFT, or are only applicable when SAF is used. Any of a variety of combinations of hyperparameters and values may be used, including values not shown in TABLE 1.

TABLE 1

| Hyperparameter | Candidate values |
| --- | --- |
| Batch Size | [64, 128, 256, 512, 1024] |
| Baseline Learning Rate | [.00003, .0001, .0003, .001, .003] |
| Self-adapting Learning Rate (SAF only) | [.00001, .00003, .0001, .0003, .001] |
| Number of hidden units | [32, 64, 128] |
| Number of Attention Heads (TFT only) | [1, 2, 4] |
| Dropout Keep Probability (TFT only) | [0.5, 0.8, 0.9, 1.0] |
| Encoder Window Length | [50, 75, 100] |
| Representation Combination | [Additive, Concatenation] |
| Max. Number of Iterations | [5000] |

Figure 3B:
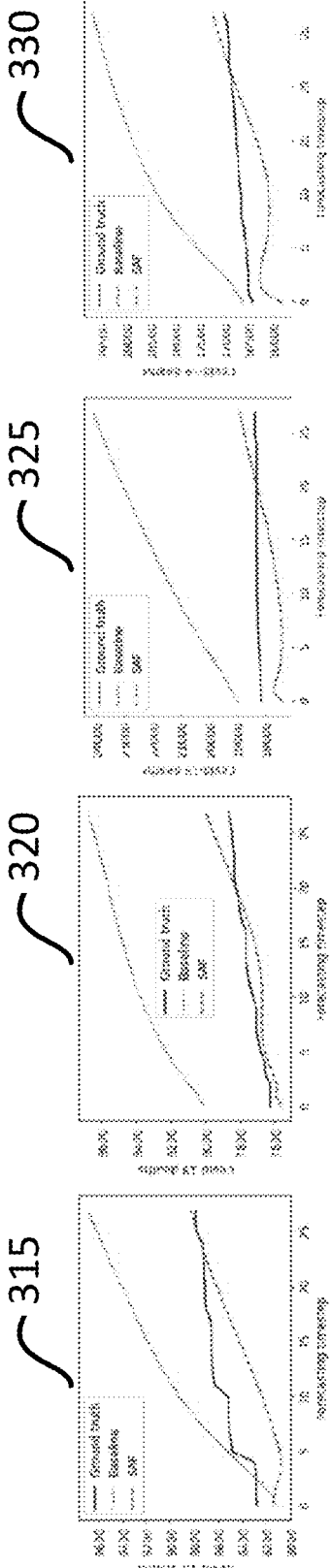
FIG. 3B illustrates charts representing forecasted to actual COVID-19 deaths according to baseline and SAF-executed models, according to aspects of the disclosure.

FIG. 3B illustrates charts 315, 320, 325, and 330 representing forecasted actual COVID-19 deaths according to baseline and SAF-executed models. Each chart 315, 320, 325, and 330, corresponds to the number of deaths due to COVID-19 in a respective US state along the y axis, over a period of time measured in timesteps along the x axis. The black line of each chart represents the ground-truth number of deaths at each timestep. The blue dotted line in each chart represents forecasts of COVID-19 deaths for a baseline (i.e., without SAF) multi-horizon forecasting model. Specifically, forecasts tracked in FIG. 3B are for an LSTM Seq2Seq model. The red dashed line in each chart represents forecasts by a SAF-executed model, that is, the LSTM Seq2Seq baseline model in which SAF is used at inference.

FIG. 3B illustrates how SAF can help a model in learning the overall trend behavior accurately and preventing unrealistic exponential growth, a typical problem suffered by autoregressive models for multi-horizon prediction. In some cases, SAF can help to learn the initial forecasting point more accurately. For example, as shown in FIG. 3B in the discovery by the SAF-executed model that COVID-19 cumulative deaths on the first prediction date should not be significantly different from the last observed cumulative value. Note that such knowledge is not embodied in the black-box LSTM architecture and the SAF-executed model needs to learn this knowledge from a small amount of training data. The inductive bias coming from SAF can help in learning this knowledge, as the backcasting task also provides supervision to learn the continuity of the cumulative quantities.

Example Methods

FIG. 4A is a flowchart of an example process 400A for processing observed data through a multi-horizon forecasting model using SAF, according to aspects of the disclosure.

The SAF system generates an encoded representation of a time window that masks a portion of a time window of data points of a time-series dataset, according to block 410A.

The SAF system generates an encoded representation of at least the masked portion of the time window, according to block 415A. In some examples, the SAF system generates an encoded representation for the input, including the masked and unmasked portions. The SAF system generates the encoded representation using an encoder of the multi-horizon forecasting model processed using SAF.

The SAF system generates a backcast of the encoded representation, according to block 420A. The backcast includes one or more data points predicted at the one or more timesteps of the masked portion of the time window. The SAF system uses a backcast decoder model to generate the backcast, which is part of the SAF system and not a component of the multi-horizon forecasting model.

The SAF system updates weights for one or both of an encoder and backcast decoder machine learning model of the multi-horizon forecasting model, based on error values between the one or more data points of the backcast and the one or more data points of the masked portion of the time window, according to block 425A.

For each masked data point, the SAF system generates error values between data points in the backcast generated by the updated backcast decoder machine learning model, and the masked data point, according to block 430A.

The SAF system generates an encoded representation of the time window, using an encoder having the one or more updated weights receiving the time window and the error values as input, according to block 435A. As described herein with reference to FIG. 2A, the encoder can be configured to generate encoded representations with or without the backcast error values as generated, for example, according to block 430A. The backcast error values can be additional signals used by the encoder for generating the encoded representation.

The SAF system generates a forecast of one or more data points at one or more future points in time using the encoded representation of the time window, according to block 440A. The one or more future points in time can be defined by a horizon and cover the range of timesteps between a prediction time in which inference is performed, and the horizon. The future points in time can be specified in other ways, for example predetermined to always be a certain amount of time into the future relative to the prediction time.

TABLE 2, below, shows an example implementation of a model trained using SAF at inference. Brackets indicating ranges are inclusive, e.g., [1:N] includes all elements between 1 and N, including 1 and N.

TABLE 2

| 1. | Receive:<br>input observed time-series dataset x,<br>encoder e($\cdot$; $\Omega_e$), with weights $\Omega_e$<br>backcast decoder $d^{(b)}$($\cdot$; $\Omega_{d^{(b)}}$) with<br>weights $\Omega_{d^{(b)}}$, forecast decoder $d^{(f)}$($\cdot$; $\Omega_{d^{(f)}}$)<br>with weights $\Omega_{d^{(f)}}$,<br>prediction time t,<br>horizon h, h > t<br>mask length n, and<br>input window length m. | Horizon h may be predetermined or<br>received as input.<br><br><br>Output is forecasts $\hat{y}$ containing<br>forecasts $y_{t+1}$ . . . $y_h$ where $y_i$ is<br>forecast for $i^{th}$ future timestep<br>between prediction time t and horizon<br>h. |
|---|---|---|
| 2. | $\Theta$ = Tile(x[t – m + n + 1]) | Tile last element $\Theta$ of the unmasked<br>portion (closest in time to the masked<br>portion). |
| 3. | r = e([$\Theta$, x[t – m + n + 1 : t]]) $\cup$<br>0; $\Omega_e$) | Obtain encoded representation r for<br>the masked portion [t – m + 1 ; t –<br>m + n] of input window with tiled<br>element $\Theta$.<br>Zero is a placeholder for backcast<br>errors, which are not provided to the<br>encoder in step 2. (See step 8). |
| 4. | b = $d_b$(r; $\Omega_{d^{(b)}}$) | Obtain backcasts b for the encoded<br>representation r, using the unmasked<br>portion of the encoded representation. |
| 5. | $\Omega_{d^{(b)}}^{(m)} \leftarrow \Omega_{d^{(b)}} - \alpha \cdot \nabla_{\Omega_{d^{(b)}}} L(b, x[t –$<br>m + 1 : t – m + n]) | Self-adapting: Update the decoder<br>weights $\Omega_{d^{(b)}}$ with the backcast loss<br>L(b, x[t – m – 1 : t]) times a<br>learning hyperparameter $\alpha$ and the<br>gradient $\nabla_{\Omega_{d^{(b)}}}$ of the backcast decoder<br>weights with respect to the backcast<br>loss. |
| 6. | r' = e(x[t – m + 1 : t] $\cup$ 0; $\Omega_e^{(m)}$) | Obtain encoded representation r' for<br>the input window (using encoder e<br>with updated weights $\Omega_e^{(m)}$).<br>Zero is a placeholder for backcast<br>errors, which are not provided in step<br>5 (see step 8) |
| 7. | b' = $d_b$(r'; $\Omega_{d^{(b)}}^{(m)}$) | Obtain backcasts b' for the encoded<br>representation r' using backcast<br>decoder encoder$d_b$ with updated<br>weights $\Omega_{d^{(b)}}^{(m)}$). |
| 8. | errors = b' – x[t – m + 1 : t – m + n] | Obtain errors between the backcasts<br>and masked portion of input window<br>(using pair-wise difference for each<br>element i in<br>b and x[t – m – 1 : t – n – 1]). |
| 9. | r" = e(x[t – m + 1 : t – m + n] $\cup$<br>errors; $\Omega_e^{(m)}$) | Obtain encoded representation r" for<br>the entire input window, combined<br>with the backcast errors.<br>Encoder e receives errors in addition<br>to input window<br>x[t – m – 1 : t].<br>Zero is used instead of backcast<br>errors when backcast errors are not<br>provided as input (see steps 2 and 5). |
| 10. | $\hat{y}$ = $d^{(f)}$ (r"; $\Omega_{d^{(f)}}$) | Forecasts $\hat{y}$ containing forecasts<br>$y_{t+i}$ . . . $y_h$ where $y_i$ is forecast for $i^{th}$<br>future timestep between prediction<br>time t and horizon h. |

FIG. 4B is a flowchart of an example process 400B for processing different time-series datasets through a multi-horizon forecasting model using SAF, according to aspects of the disclosure. The example process 400B demonstrates how SAF can be performed on multiple different time-series datasets, updating encoder and backcast decoder weights for each dataset from a stored copy.

The SAF system stores trained weights for one or both of an encoder machine learning model and a backcast decoder machine learning model, according to block 410B. For example, the SAF system can store the weights in a model data repository, as described with reference to FIG. 1.

The SAF system receives a plurality of time-series datasets, according to block 420B. Each time-series dataset can be part of a common dataset or be part of observed for different and unrelated observed systems, as examples.

For each time-series dataset, the SAF system generates a respective copy of the stored trained weights, according to 430B. For each instance of SAF executed using a respective time-series dataset, the SAF system updates a copy of the stored weights, as opposed to the stored weights themselves.

The SAF system updates the respective copies of stored weights, based at least on respective error values between one or more data points of a backcast generated using a respective encoded representation of a masked portion of a time window for each received time-series dataset, and the one or more data points of the masked portion of the time window of the received time-series dataset, according to block 440B.

For each of the plurality of time-series datasets, the SAF system generates a respective forecast of one or more future points in time, according to block 450B. In some examples, the SAF system performs blocks 440B and 450B by performing the process 400A, but for each time-series dataset and respective copy of weights of the encoder and backcast decoder model.

Figure 5:
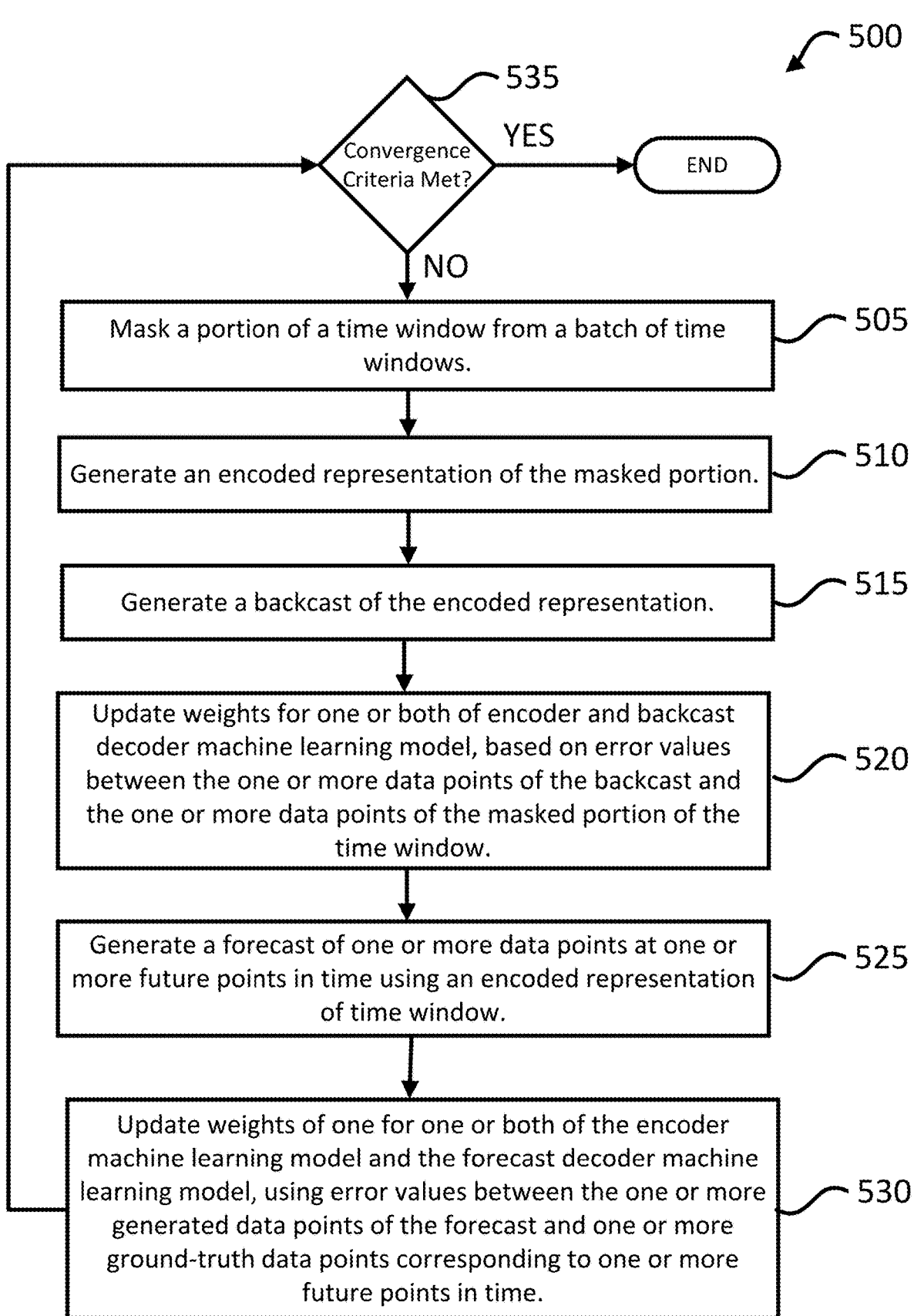
FIG. 5 is a flowchart of an example process 500 for training a multi-horizon forecasting machine learning model using SAF, according to aspects of the disclosure.

FIG. 5 is a flowchart of an example process 500 for training a multi-horizon forecasting machine learning model using SAF, according to aspects of the disclosure.

The SAF system masks a portion of a time window from a batch of time windows, according to block 505. The SAF system can sample a batch of time windows of a predetermined window length from one or more different time-series datasets including observed data for one or more entities. For example, in the batch of time windows can be time-series data from different datasets, and for different entities represented by those datasets. Although the process 500 is described with reference to a single time window, the SAF system can repeat the process 500 over the entire batch of time windows, and update the weights of the encoder, backcast decoder, and forecast decoder using batch gradient descent with weight updates.

The SAF system generates an encoded representation of the masked portion of the time window, according to block 510. The SAF system can use an encoder of the multi-horizon forecasting model being trained. The weights of the encoder can be randomly initialized or be pretrained, as examples.

The SAF system generates a backcast of the encoded representation, according to block 515. The SAF system uses a backcast decoder to generate the backcast. The weights of the backcast decoder can be randomly initialized or pretrained, for example.

The SAF system updates weights for one or both of the encoder and backcast machine learning models, based on error values between one or more data points of the backcast and the one or more data points of the masked portion of the time window, according to block 520.

The SAF system generates a forecast of one or more data points at one or more future points in time using an encoded representation of the time window, according to block 525. The encoded representation can be generated using the updated encoder and backcast decoder and using backcast error values as described herein.

The SAF system updates weights of one or both of the encoder and forecast machine learning model, using error values between the one or more generated data points of the forecast and one or more ground-truth data points corresponding to one or more future points in time, according to block 530.

The SAF system determines whether convergence criteria for training the multi-horizon forecasting model have been met, according to diamond 535. Convergence criteria are criteria for determining when training should end. For example, the convergence criteria may specify a threshold loss function value, or threshold backcast or forecasting error. Other criteria for stopping training can also be used in addition to or in place of convergence criteria, such as criteria specifying a maximum number of iterations or a maximum amount of training data for training the model.

If the SAF system determines convergence criteria have not been met ("NO"), then the SAF system continues training starting at block 505. The SAF system, prior to continuing training, may sample a new batch of time windows. If the SAF system determines convergence criteria have been met ("YES"), then the SAF system stops training.

TABLE 3, below, shows an example process for training a machine learning model using SAF.

TABLE 3

| | | |
|---|---|---|
| 1. | Receive:<br>    training dataset $S = \{(x, y)\}^N$,<br>$(x, y)$ corresponding to observed time-series<br>dataset x and ground-truth forecast y, including<br>individual forecasts $y_i$, $i \in [t + 1, h]$ for horizon<br>h. Training dataset S having N training examples,<br>$N \geq 1$. | Encoder weights $\Omega_e$, backcast decoder<br>weights $\Omega_{d(b)}$, and forecast decoder<br>weights $\Omega_{d(f)}$) may be previously<br>trained or randomly initialized. |
| | | |
| | encoder $e(\bullet; \Omega_e)$, with weights $\Omega_e$<br>    backcast decoder $d^{(b)}(\bullet; \Omega_{d(b)})$ | Horizon h can be predetermined or<br>provided as input. |
| | with weights $\Omega_{d(b)}$,<br>    forecast decoder $d^{(f)}(\bullet; \Omega_{d(f)})$ | |
| | with weights $\Omega_{d(f)}$),<br>    prediction time t,<br>    horizon h, h > t<br>    mask length n, and<br>    input window length m. | |
| 2. | While until convergence do | |
| 3. | $(x_B, y_B) \in S$ | Sample a batch of windows $x_B$. Each<br>element i in $x_B$ is a sampled time<br>window of length m, and each element<br>i in $y_B$ is the ground-truth forecast for<br>element i in $x_B$ up to horizon h. |
| 4. | $\Theta_\beta = \text{Tile}(x_B[t - m + n + 1])$ | The last element of the unmasked<br>portion. |
| 5. | $r_B = e([\Theta_B, x_B[t - m + n + 1 :$<br>$t] \cup 0 ; \Omega_e)$ | Obtain encoded representation $r_B$ for<br>the masked portion $[t - m + 1 : t -$<br>$m + n]$ of input window with tiled<br>element $\Theta$.<br>Zero is a placeholder for backcast<br>errors, which are not provided to the<br>encoder in step 2. (See step 9). |
| 6. | $b_B = d_b(r_B; \Omega_{d(b)})$ | Obtain backcasts $b_B$ for the encoded<br>representation $r_B$, using the unmasked<br>portion of the encoded representation. |
| 7. | $\Omega_e \leftarrow \Omega_e - \alpha \cdot \nabla_{\Omega_e} L(b_B, x_B[t -$<br>$m + 1 : t - m + n])$ | Self-adapting: Update the encoder<br>weights $\Omega_e$ with the backcast loss<br>$L(b, x_B[t - m + 1 : t - m + n])$<br>times a learning hyperparameter $\alpha$ and |

TABLE 3-continued

|  |  | the gradient $\nabla_{\Omega_e}$ of the encoder weights with respect to the backcast loss. |
|---|---|---|
| 8. | $\Omega_d^{(b)} \leftarrow \Omega_d^{(b)} \, \alpha \cdot \nabla_{\Omega_d^{(b)}} L(b_B, x_B[t - m + 1 : t - m + n])$ | Self-adapting: Update the decoder with the backcast loss. |
| 9. | $b_B = d_b(r_B; \Omega_d^{(b)})$ | Obtain backcasts for the masked input window. |
| 10. | $error_B = b - x_B[t - m + 1 : t - m + n]$ | Obtain errors for the backcasts. |
| 11. | $r'_B = e(x_B[t - m + 1 : t]) \cup error_B; \Omega_e)$ | Obtain an encoded representation for the input window combined with the errors. |
| 12. | $\hat{y}_B = d^{(f)}(r_B; \Omega_d^{(f)})$ | Forecast. |
| 13. | $\Omega_e \leftarrow \Omega_e - \gamma \cdot \nabla_{\Omega_e} L(\hat{y}_B, y_B)$ | Update the encoder with the forecast loss. |
| 14. | $\Omega_d^{(f)} \leftarrow \Omega_d^{(f)} - \gamma \cdot \nabla_{\Omega_d^{(f)}} L(\hat{y}_B, y_B)$ | Update the decoder with the forecast loss. |

Example Computing Environment

Figure 6:
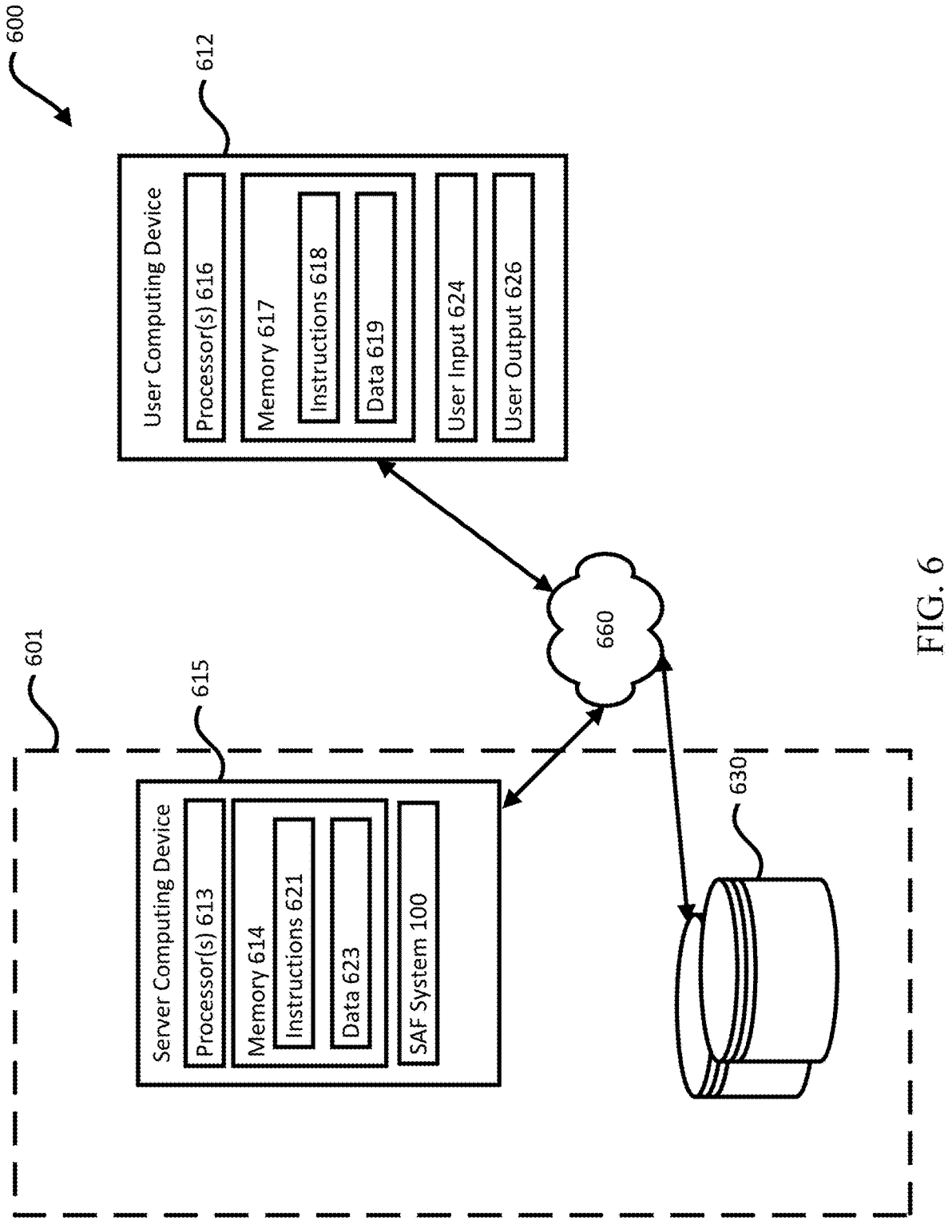
FIG. 6 is a block diagram of an example computing environment for implementing the example SAF system, according to aspects of the disclosure.

FIG. 6 is a block diagram of an example computing environment 600 for implementing the SAF system 100. The system 400 can be implemented on one or more devices having one or more processors in one or more locations, such as in server computing device 615. User computing device 612 and the server computing device 615 can be communicatively coupled to one or more storage devices 630 over a network 660. The storage device(s) 630 can be a combination of volatile and non-volatile memory and can be at the same or different physical locations than the computing devices 612, 615. For example, the storage device(s) 630 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 615 can include one or more processors 613 and memory 614. Memory 614 can store information accessible by the processor(s) 613, including instructions 621 that can be executed by the processor(s) 613. Memory 614 can also include data 623 that can be retrieved, manipulated, or stored by the processor(s) 613. Memory 614 can be a type of non-transitory computer readable medium capable of storing information accessible by the processor(s) 613, such as volatile and non-volatile memory. The processor(s) 613 can include one or more central processing units (CPUs), graphic processing units (GPUs), field-programmable gate arrays (FPGAs), and/or application-specific integrated circuits (ASICs), such as tensor processing units (TPUs).

The instructions 621 can include one or more instructions that when executed by the processor(s) 613, cause the one or more processors to perform actions defined by the instructions. The instructions 621 can be stored in object code format for direct processing by the processor(s) 613, or in other formats including interpretable scripts or collections of independent source code modules that are interpreted on demand or compiled in advance. Instructions 621 can include instructions for implementing the system 400 consistent with aspects of this disclosure. The system 400 can be executed using the processor(s) 613, and/or using other processors remotely located from the server computing device 615.

The data 623 can be retrieved, stored, or modified by the processor(s) 613 in accordance with the instructions 621. The data 623 can be stored in computer registers, in a relational or non-relational database as a table having a plurality of different fields and records, or as JSON, YAML, proto, or XML documents. The data 623 can also be formatted in a computer-readable format such as, but not limited to, binary values, ASCII, or Unicode. Moreover, the data 623 can include information sufficient to identify relevant information, such as numbers, descriptive text, proprietary codes, pointers, references to data stored in other memories, including other network locations, or information that is used by a function to calculate relevant data.

The user computing device 612 can also be configured similar to the server computing device 615, with one or more processors 616, memory 617, instructions 618, and data 619. The user computing device 612 can also include a user output 626, and a user input 624. The user input 624 can include any appropriate mechanism or technique for receiving input from a user, such as keyboard, mouse, mechanical actuators, soft actuators, touchscreens, microphones, and sensors.

The server computing device 615 can be configured to transmit data to the user computing device 612, and the user computing device 612 can be configured to display at least a portion of the received data on a display implemented as part of the user output 626. The user output 626 can also be used for displaying an interface between the user computing device 612 and the server computing device 615. The user output 626 can alternatively or additionally include one or more speakers, transducers or other audio outputs, a haptic interface or other tactile feedback that provides non-visual and non-audible information to the user of the user computing device 612.

Although FIG. 6 illustrates the processors 613, 616 and the memories 614, 617 as being within the computing devices 615, 612, components described in this specification, including the processors 613, 616 and the memories 614, 617 can include multiple processors and memories that can operate in different physical locations and not within the same computing device. For example, some of the instructions 621, 618 and the data 623, 619 can be stored on a removable SD card and others within a read-only computer chip. Some or all of the instructions and data can be stored in a location physically remote from, yet still accessible by, the processors 613, 616. Similarly, the processors 613, 616 can include a collection of processors that can perform concurrent and/or sequential operation. The computing devices 615, 612 can each include one or more internal clocks providing timing information, which can be used for time measurement for operations and programs run by the computing devices 616, 612.

The server computing device 615 can be configured to receive requests to process data from the user computing device 612. For example, the server computing device 615 and the storage device(s) 630 can be part of a computing platform 601 configured to provide a variety of services to users, through various user interfaces and/or APIs exposing the platform services. One or more services can be a machine learning framework or a set of tools for generating neural networks or other machine learning models according to a specified task and training data.

The devices 612, 615 can be capable of direct and indirect communication over the network 660. The devices 615, 612 can set up listening sockets that may accept an initiating connection for sending and receiving information. The network 660 itself can include various configurations and protocols including the Internet, World Wide Web, intranets, virtual private networks, wide area networks, local networks, and private networks using communication protocols proprietary to one or more companies. The network 660 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 660, in addition or alternatively, can also support wired connections between the devices 612, 615, including over various types of Ethernet connection.

Although a single server computing device 615, and user computing device 612 are shown in FIG. 6, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel with other operations. Further, the separation of different system components configured for performing different operations should not be understood as requiring the components to be separated. The components, modules, programs, and engines described can be integrated together as a single system or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system for self-adapting forecasting comprising: one or more processors configured to:

receive a time-series dataset and a request to generate a forecast on the time-series dataset;

mask a portion of a time window of data points of the time-series dataset to generate a masked portion of the time window;

generate an encoded representation of the masked portion of the time window using an encoder machine learning model, the encoder machine learning model comprising one or more weights;

generate a backcast of the encoded representation, using a backcast decoder machine learning model based on an unmasked portion of the time window and the encoded representation;

compute one or more error values between one or more data points of the backcast and one or more data points of the masked portion of the time window;

update the one or more weights of the encoder machine learning model based on the one or more error values;

generate an encoded representation of the time window using the encoder machine learning model, the encoder machine learning model comprising the one or more updated weights; and generate the forecast on the time-series dataset using a forecast decoder machine learning model based on the encoded representation of the time window.

2. The system of claim 1, wherein the encoder machine learning model is configured to generate the encoded representation of the time window based on the time window and the one or more error values.

3. The system of claim 1, wherein the one or more processors are further configured to update one or more weights of the backcast decoder machine learning model based on the one or more error values.

4. The system of claim 1, wherein the one or more processors are further configured to:

compute one or more error values between one or more data points of the forecast and one or more data points of a ground-truth forecast; and update one or more weights of the forecast decoder machine learning model based on the one or more error values between the one or more data points of the forecast and the one or more data points of the ground-truth forecast.

5. The system of claim 1, wherein the one or more processors are configured to mask the portion of the time window using a data point of the unmasked portion of the time window.

6. The system of claim 1, wherein the masked portion of the time window comprises half the length of the time window.

7. The system of claim 1, wherein the one or more processors are configured to update the one or more weights of the encoder machine learning model by performing a single-step gradient descent update.

8. The system of claim 1, wherein the forecast decoder machine learning model is configured to generate the forecast based on a similarity of the encoded representation of the time window to similar states in windows of the time-series dataset.

9. A computer-implemented method for self-adapting forecasting, the method comprising:

receiving, by one or more processors, a time-series dataset and a request to generate a forecast on the time-series dataset;

masking, by the one or more processors, a time window of data points of the time-series dataset to generate a masked portion of the time window;

generating, by one or more processors, an encoded representation of the masked portion of the time window using an encoder machine learning model, the encoder machine learning model comprising one or more weights;

generating, by the one or more processors, a backcast of the encoded representation using a backcast decoder machine learning model based on an unmasked portion of the time window and the encoded representation;

computing, by the one or more processors, one or more error values between one or more data points of the backcast and one or more data points of the masked portion of the time window;

updating, by the one or more processors, the one or more weights of the encoder machine learning model, based on the one or more error values;

generating, by the one or more processors, an encoded representation of the time window using the encoder machine learning model, the encoder machine learning model comprising the one or more updated weights; and generating, by the one or more processors, the forecast on the time-series dataset using a forecast decoder machine learning model based on the encoded representation of the time window.

10. The method of claim 9, wherein the encoder machine learning model is configured to generate the encoded representation of the time window based on the time window and the one or more error values.

11. The method of claim 9, further comprising updating, by the one or more processors, one or more weights of the backcast decoder machine learning model based on the one or more error values.

12. The method of claim 9, further comprising:

computing, by the one or more processors, one or more error values between one or more data points of the forecast and one or more data points of a ground-truth forecast; and updating, by the one or more processors, one or more weights of the forecast decoder machine learning model based on the one or more error values between the one or more data points of the forecast and the one or more data points of the ground-truth forecast.

13. The method of claim 9, wherein masking the portion of the time window further comprises masking the portion of the time window using a data point of the unmasked portion of the time window.

14. The method of claim 9, wherein the masked portion of the time window comprises half of the number of timesteps in the time window.

15. The method of claim 9, wherein updating the one or more weights of the encoder machine learning model further comprises performing a single-step gradient descent update.

16. The method of claim 9, wherein the forecast decoder machine learning model is configured to generate the forecast based on a similarity of the encoded representation of the time window to similar states in windows of the time-series dataset.

17. One or more non-transitory computer-readable storage media, encoding instructions that, when executed by one or more processors, cause the one or more processors to perform operations comprising:

receiving a time-series dataset and a request to generate a forecast on the time-series dataset;

masking a portion of a time window of data points of the time-series data-set to generate a masked portion of the time window;

generating an encoded representation of the masked portion of the time window using an encoder machine learning model, the encoder machine learning model comprising one or more weights;

generating a backcast of the encoded representation; using a backcast decoder machine learning model based on an unmasked portion of the time window and the encoded representation;

computing one or more error values between one or more data points of the backcast and one or more data points of the masked portion of the time window;

updating the one or more weights of the encoder machine learning model based on the one or more error values;

generating an encoded representation of the time window using the encoder machine learning model, the encoder machine learning mode comprising the one or more updated weights; and generating the forecast on the time-series dataset using a forecast decoder machine learning model based on the encoded representation of the time window.

* * * * *